United States Patent [19]

Klein et al.

[11] 4,294,744

[45] Oct. 13, 1981

[54] PROCESS FOR FORMING A POWDERED EPDM TERPOLYMER (C-955)

[75] Inventors: Robert R. Klein, Berkeley Heights, N.J.; Henry S. Makowski, deceased, late of Scotch Plains, N.J., by Patricia Makowski, executrix

[73] Assignee: Exxon Research & Engineering Co., Florham Park, N.J.

[21] Appl. No.: 136,366

[22] Filed: Apr. 1, 1980

[51] Int. Cl.$^3$ ................................................ C08F 6/12
[52] U.S. Cl. ........................... 260/33.6 AQ; 525/232; 526/282; 526/336; 526/339; 528/497; 528/498
[58] Field of Search ................ 528/498, 497; 526/336, 526/339; 260/33.6 AQ; 525/232

[56] References Cited

U.S. PATENT DOCUMENTS

| 3,437,645 | 4/1969 | Paige et al. | 526/336 |
|---|---|---|---|
| 3,895,035 | 7/1975 | Berg et al. | 260/33.6 AQ |
| 3,922,240 | 11/1975 | Berg et al. | 260/33.6 AQ |
| 3,929,707 | 12/1975 | Berg et al. | 260/33.6 AQ |
| 3,945,978 | 3/1976 | Berg et al. | 260/33.6 AQ |
| 3,998,778 | 12/1976 | Berg et al. | 526/339 |
| 4,124,559 | 11/1978 | Koch et al. | 260/33.6 AQ |

*Primary Examiner*—Stanford M. Levin
*Attorney, Agent, or Firm*—Richard E. Nanfeldt

[57] ABSTRACT

A process for forming a powdered EPDM terpolymer, wherein the powder of said EPDM terpolymer has a volume density of about 10 to about 30 lb/ft$^3$ which includes the steps of adding a cement of an EPDM terpolymer in a hydrocarbon solvent to water, a volume ratio of the water to the cement being about 60 to 1 to about 2 to 1; emulsify under high-shear the blend of the water and the cement thereby forming a dispersion of particles of the EPDM terpolymer in the water; steam stripping under high agitation the emulsified blend of the EPDM terpolymer, the water and the solvent thereby removing the solvent from the emulsified blend; filtering the dispersion of the particles of the EPDM terpolymer in the water to recover a wet powder of the EPDM terpolymer; and hot-air drying the wet powder of the EPDM terpolymer in a fluid-bed dryer.

5 Claims, 1 Drawing Figure

PROCESS FOR FORMING A POWDERED EPDM TERPOLYMER (C-955)

BACKGROUND OF THE INVENTION

1. Field of the Invention

A process for forming a powdered EPDM terpolymer, wherein the powder of said EPDM terpolymer has a volume density of about 10 to about 30 lb/ft$^3$, which includes the steps of adding a cement of an EPDM terpolymer in a hydrocarbon solvent to water, a volume ratio of the water to the cement being about 60 to 1 to about 2 to 1; emulsifying under high shear the blend of the water and the cement thereby forming a dispersion of particles of the EPDM terpolymer in the water; steam stripping under high agitation the emulsified blend of the EPDM terpolymer, the water and the solvent thereby removing the solvent from the emulsified blend; filtering the dispersion of the particles of the EPDM terpolymer in the water to recover a wet powder of the EPDM terpolymer; and hot air drying the wet powder of the EPDM terpolymer in a fluid-bed dryer.

2. Description of the Prior Art

EPDM terpolymers are old in the art; however, due to the non-crystalline nature and the known methods of manufacturing these EPDM terpolymers, the production of a powdered EPDM terpolymer has never been successful. In the conventional process for the manufacture of EPDM terpolymers, the resultant polymer is isolated in a fused mass which is sold conventionally in large slabs or extremely large dice or pelletized particles which have volume densities of less than about 50 lb/ft$^3$. These conventionally produced EPDM terpolymers are not capable of being readily reduced in size by either grinding or other conventional techniques into a powdered form, wherein the resultant powder has a volume density of at least about 15 lb/ft$^3$. It is desirable to produce a powdered EPDM terpolymer because in the formation of extended EPDM compositions, mixing and compounding by extrusion techniques of fillers and oils into the EPDM terpolymer is maximized as the particle size of the EPDM terpolymer is decreased in size.

The instant process provides a means for producing a powdered EPDM terpolymer composition having a volume density of at least about 15 lb/ft$^3$ thereby overcoming the deficiencies inherent in the conventional processes for producing EPDM terpolymers.

SUMMARY OF THE INVENTION

It has been found surprisingly that powdered compositions of EPDM terpolymers can be readily manufactured by an improved process wherein the powder has a particle size distribution of about 500 to about 3000 microns and a volume density of about 10 lb/ft$^3$ to about 30 lb/ft$^3$.

It is well known in the fabrication of polymers that the dispersion of extenders into a polymeric matrix during compounding is directly related to the size of the polymeric particle. As the particle size of the polymer decreases, the surface area of the polymer increases, thereby permitting the polymeric matrix to more readily wet the surface of fillers thereby improving the dispersion of the filler into the matrix. Although many thermoplastic resins can be cryogenically ground into fine powders, powdered elastomeric polymers due to their low Tg are not readily obtainable by this cryogenic process. Such cryogenically ground polymers are non-porous and, at equivalent particle diameters, are of lower surface area than the powders produced in this improved process.

GENERAL DESCRIPTION

Figure 1:
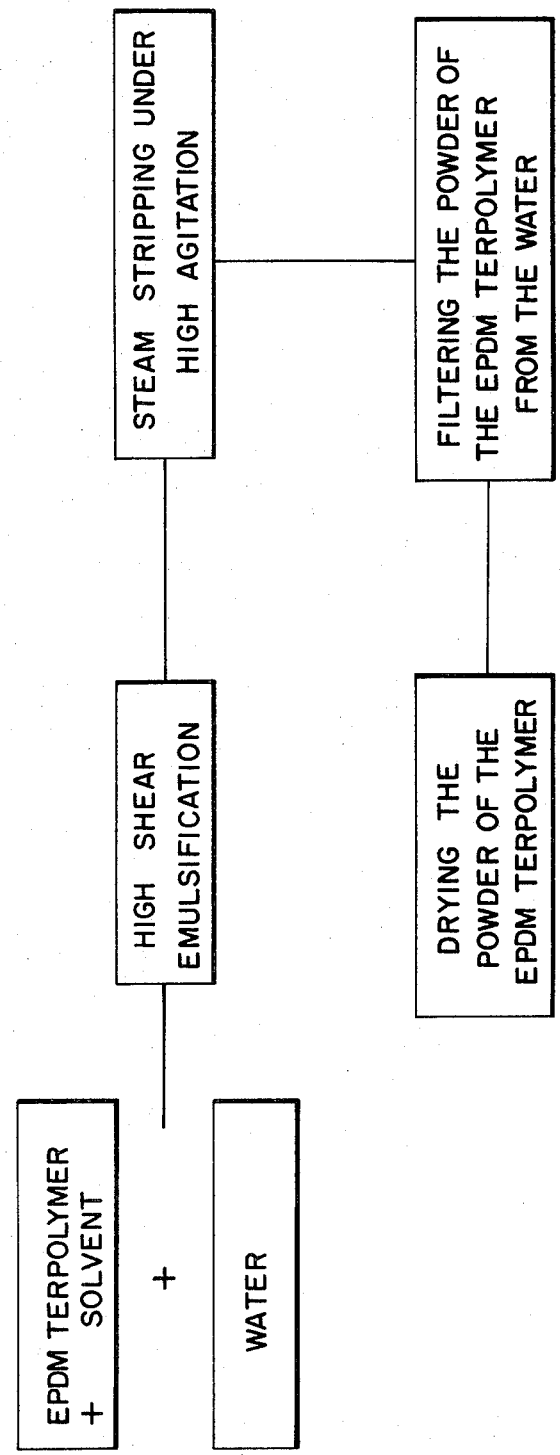
FIG. 1 illustrates a schematic drawing of the described processes of the instant invention.

The present invention relates to improved processes for the formation of powdered EPDM terpolymers having a volume density of at least about 15 lb/ft$^3$.

The EPDM terpolymers of the instant invention are low unsaturated polymers having about 1 to about 10.0 wt. percent olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082; British Pat. No. 1,030,289 and French Pat. No. 1,386,600, which are incorporated herein by reference. The preferred polymers contain about 40 to about 80 wt. percent ethylene and about 1 to about 10 wt. percent of a diene monomer, the balance of the polymer being propylene. Preferably, the polymer contains about 50 to about 70 wt. percent ethylene, e.g. 50 wt. percent and about 2.6 to about 8.0 wt. percent diene monomer, e.g. 5.0 wt. percent. The diene monomer is preferably a non-conjugated diene. Illustrative of these non-conjugated diene monomers which may be used in the terpolyme (EPDM) are 1,4 hexadiene, dicyclopentadiene, 5-ethylidene-2-norbornene, 5-methylene-2-norbornene, 5-propenyl-2-norbornene, and methyl tetrahydroindene. Some examples of useful EPDM terpolymers are Vistalon 2504 and 2504-20 (Exxon) and Nordel 1320 (duPont).

The EPDM terpolymers of this invention have a number average molecular weight ($\overline{M}n$) as measured by GPC of about 10,000 to about 200,000 more preferably of about 15,000 to about 100,000 and most preferably of about 20,000 to about 60,000. The Mooney viscosity (ML, 1+8, 212° F.) of the EPDM terpolymer is about 5 to about 60, more preferably about 10 to about 50, and most preferably about 15 to about 40.

The cements of the EPDM terpolymers can be prepared from preformed and isolated polymers through re-solution. Preferably, the cements are those which exist at the end of manufacturing process, prior to dry polymer isolation.

When cements of EPDM terpolymers are contacted with water a marked increase in cement viscosity or the formation of a gel occurs. When the cement is composed of a single organic solvent viscosity increases or gelation occurs through the interaction of water with the ionic groups thereby resulting in an increased degree of association of the polymer chains. When the cement is composed of a binary solvent the water also serves to remove the solubilizing polar cosolvent. Thus in the process of this invention the water is not simply serving as a dispersion medium but exercises a vitally important function in the formation of powders.

When the cements of EPDM terpolymers are contacted with water under high shear very small particles of cement dispersed in water are formed. The polar cosolvent, if present, is rapidly extracted into the water phase, and water rapidly diffuses into the organic phase to effect marked viscosity increases in the cement particle or a gelation of the particle. Under these conditions the swollen particle is extremely stable and will not agglomerate with other such particles. Particle stability is not the result of emulsifiers or other such stabilizing compounds but is due simply to the high viscosity or high gel strength of the cement.

Once such dispersions are prepared they are very stable and can be stored for long periods without substantial agglomeration. In addition, because of the high gel strength of the swollen particle not only is agglomeration of the particles substantially prevented but also adhesion of the particles to surfaces is prevented. Thus, one significant advantage of this process is that little if any fouling occurs either during the preparation of the dispersion or during the solvent stripping operation with hot water.

The stripping of the solvent from the swollen particle is promoted by the small size of the particle. Solvent stripping is not only very rapid but also very efficient. In addition, when the solvent is stripped the particle remains very porous since the gel network remains during and after solvent removal and the solvnt is thereby replaced by empty space.

The wet powders are more readily dried because of their high surface areas in equipment such as tunnel dryers, fluid bed dryers, tray dryers, vacuum dryers, and the like. This overall process permits the isolation and drying of powdered EPDM terpolymers.

The powders prepared according to the process of this invention possess many advantages over polymers which are much larger in size and which are not porous. In thermoelastic applications the polymer is formulated with a wide variety of fillers, extenders, and other additives in order to reduce material cost while improving the properties of the composition. Normally this sort of mixing is conducted with high shear energy intensive mixers. While this is indeed possible with the powders of this invention it is preferred that the powders by dry-mixed with the various ingredients to obtain a well-dispersed, homogeneous blend which requires little additional mixing on fluxing. The dry mixes can be charged directly to injection molders where the fluxing and little additional mixing provides for a uniform and well dispersed article. These dry mixes also permit the formulation of ion-containing polymers which possess such high melt viscosities that the mixing of such polymers with large particle sizes results in poor dispersion, poor rheological properties, and poor properties of the final article.

The small size and porous nature of the powders produced according to the instant process also allows for very rapid solution of the ion-containing polymers either in single solvent or binary solvent systems. Rapid solution is not only very desirable but absolutely necessary in some applications for economical operation in respect to both time and energy saving.

The EPDM terpolymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane, wherein the concentration of the polymer in the cement is about 1.0 to about 40.0 g/100 ml of cement, more preferably about 5.0 to about 30.0 and most preferably about 10.0 to about 25.0.

The ability of cements to function in this invention is dependent upon the viscosity of the cement particle after contacting with water. The cement particle may contain not only the EPDM terpolymer but also fillers, extender oils and other additives.

To the EPDM terpolymer in the cement can be added a non-polar backbone process oil. The oils employed in the present invention are non-polar process oils having less than about 2 wt. percent polar-type compounds as measured by molecular-type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3300 ssu's at 100° F. and a number average molecular weight of about 300 to about 1000, and more preferably about 300 to 750. The preferred process oils are paraffinics. Table I illustrates typical oils encompassed by the scope of this invention. The oils are incorporated into the blend composition at a concentration level of about 20 to about 200 parts by weight per 100 parts by weight of the EPDM terpolymer, more preferably at about 20 to about 175, and most preferably at about 25 to about 150.

TABLE I

| Type Oil | Oil Code# | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | | 1.3 | 70.3 | 28.4 |
| Naphthenic | Flexon 765 | 505 | | 0.9 | 20.8 | 78.3 |

The cement of the EPDM terpolymer is added to water, wherein emulsification of the cement can be done batchwise using equipment such as a Waring Blender, Gifford Wood Laboratory mixer or a Barinco mixer. It can also be done continuously using commercially available emulsification equipment such as a Greerco hi-shear pipeline mixer, a Tekmar Dispax emulsion mill or a colloid mill. The continuous process for the formation of the cement slurry in water using equipment such as a 2" Greerco hi-shear pipeline mixer is conducted with rotor speeds of about 5000 RPM's to about 10,000 RPM's, more preferably about 7500 to about 10,000 and most preferably about 8000 to about 10,000. Further fine particle sizes with narrow size distribution can be obtained by using the Greerco tandem shear head configuration and by increasing the residence time of the slurry under the high shear conditions. This can be done by recycling the slurry through the mixer at recycle rate of about 1 to 1 to about 10 to 1 which is substantially the same as reducing the slurry flow rate through the mixer by the same ratios. Fine uniform particles can also be obtained by processing the slurry through a series of mixers in line, that is, process the slurry through from about 2 to about 4 mixers in series. The mixers in this series configuration can also be operated with recycle in the range given above. To the cement of the EPDM terpolymer is added water at a volume ratio of water to cement of about 60 to 1 to about 2 to 1 more preferably about 20 to 1 to about 2 to 1 and most preferably about 4 to 1 to about 2 to 1. The slurry is subjected to a solvent flashing operation such as in a batch steam stripper, thereby effecting removal of the solvent. The slurry particles of a fine powder of EPDM terpolymer can be further washed with water and subsequently filtered. The particles are then hot air dried in a fluid bed dryer or flash dryers or tunnel dryers to a water content of less than 2 wt. percent of water, more preferably less than about 1 wt. percent, and most preferably less than about 0.5 wt. percent. The formed and dried powdered particles have a volume density of about 15 to about 30 lbs/cubic foot, more preferably about 18 to about 25, and most preferably about 20 to about 25.

The particle size distribution of the formed powder can be measured by sieve analysis wherein the weight percent retained on U.S. Sieve Number Screens is:

TABLE II

| U.S. Sieve Screen Number | Retained Powder Wt. % |
|---|---|
| 10–20 | about 60 to about 95 |
| 20–40 | about 3 to about 36 |
| 40–60 | about 0.5 to about 3.0 |

The formed powder can be readily dry blended with various chemical additives such as the previously mentioned non-polar process oils or with fillers, polyolefinic thermoplastics or waxes and mixtures thereof. The blend composition of the powder and additive can be compounded on a two-roll mill or fed directly into an extruder in order to be extruded or injection molded directly into a finished article. Other methods known in the art which are suitable for making these compositions include those methods employed in the plastic and elastomer industries for mixing polymer systems. An excellent polymer blend composition of this invention can be obtained through the use of a high-shear batch intensive mixer called the Banbury. Alternatively, economic advantages in terms of time and labor savings can be obtained through the use of a Farrel Continuous Mixer, a twin screw extruder, or extrusion techniques which are continuous mixing type equipment. The Banbury mixing device is the preferred batch-type mixer and the twin screw extruder is the preferred continuous mixer.

The fillers employed in the present invention are selected from the group consisting of carbon blacks, talcs, ground calcium carbonate, water precipitated calcium carbonate, and delaminated, calcined and hydrated clays and mixtures thereof. These fillers are incorporated into the blend composition of about 25 to about 350 parts by weight per 100 parts by weight of the EPDM terpolymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85, and most preferably about 10 to about 75. Typical fillers employed in this invention are illustrated in Table III.

TABLE III

| Filler | Code # | Oil Absorption grams of oil/100 grams of filler | Specific Gravity | Average Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate (talc) | Mistron Vapor | 60–70 | 2.75 | 2 | 9.0–7.5 |

Waxes used in the instant invention are derived from various sources: petroleum waxes covering paraffin and microcrystalline wax; synthetic waxes including polyethylene and Fischer-Tripsch wax; natural waxes from plants, insects and animals. The petroleum and synthetix waxes are most important for the present invention.

Other than paraffinic, naphthenic and aromatic hydrocarbon group waxes can contain polar functional groups such as alcohols, ketones, and esters. It is preferred that the waxes used in this invention be predominantly non-polar since polar functional groups function as plasticizers for the ionic sulfonate groups. Excessive plasticization is undesirable. The largest percentage of polar functional groups in waxes are those containing oxygen by virtue of hydrocarbon oxidation. For the purpose of this invention, a wax is considered to be non-polar when it contains less than 4.0 weight percent, more preferably less than 2.0 weight percent oxygen.

The waxes are incorporated into the blend composition at a concentration level of about 2 to about 20 parts by weight per 100 parts by weight of the EPDM terpolymer, more preferably about 2 to 15, and most preferably about 7 to about 15.

The waxes employed in the present invention have a softening point of about 125° F. to about 220° F., more preferably about 135° F. to about 200° F., and most preferably about 150° F. to about 200° F. The preferred waxes have an $\overline{M}n$ of about 300 to about 4000. These waxes are typically crystalline wherein the percent crystallinity can vary depending on the composition of the wax and the $\overline{M}n$.

A crystalline polyolefinic thermoplastic can be incorporated into the powder blend composition in minor proportions as a means for modification of the rheological properties of the blend compositions as well as the physical properties of the polymeric article. Typically, the crystalline polyolefinic thermoplastic is added to the blend composition at a concentration level of less than about 100 parts by weight of the EPDM terpolymer, more preferably at less than about 75, and most preferably at about 5 to about 50.

The crystalline polyolefin is characterized as a polymer of an alpha-olefin having a molecular weight of at least 2000; preferably at least 10,000; and most preferably at least 20,000. This material comprises substantially an olefin but may incorporate other monomers, for example, vinyl acetate, acrylic acid, methyl acrylate, ethyl acrylate, sodium acrylate, etc. The preferred polyolefins are selected from the group consisting of polymers of $C_2$ to $C_4$ alphaolefins. Most preferably, the polyolefins are selected from the group consisting of polyethylene, polybutene, polypropylene, and ethylene-propylene copolymers. It is critical that the crysalline polyolefin have a degree of crystallinity of at least 40 percent.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

An EPDM having a Mooney viscosity of 40 ($M_L$, 1+8, 212° F.) and containing about 45 weight percent ethylene, 50 weight percent propylene and 5 weight percent ENB was dissolved in hexane at a concentration of 116.5 gm EPDM/1000 ml hexane. This cement was then poured into a flask containing about 2 liters of room temperature distilled water. The cement was initially dispersed into the water using a Waring Blender. The system was then subjected to "hi-shear" agitation using a Gifford-Wood Model 1LA Lab. Homo-Mixer. The mixing was maintained until finely divided cement particles were dispersed into the water phase. The slurry was then transferred to a 4-liter agitated flask equipped with a steam sparge where solvent stripping was effected.

The process used no slurry aid to assist in preventing agglomeration of the EPDM particles during stripping. The wet crumb as removed from the stripper was in the form of discrete particles, ranging in size from 5 to 20 mesh.

A portion of the wet crumb was stored in an open dish at ambient condition for 1 day. It was observed severe agglomeration of the EPDM particles occurred under these conditions.

A portion of the wet powder was subjected to hot air drying using an Aeromatic Model STRA-1 laboratory fluid-bed dryer. The inlet air temperature was maintained at 70° C. and the drying was completed in 1½ hours. Under these drying conditions the EPDM coalesced into the fused mass. Howevery, the final moisture content was less than 1 weight percent $H_2O$.

This example demonstrates the utility of this process for the manufacture of a fine powder of a moderate molecular weight EPDM having little or no crystallinity. The advantage of this process with EPDM cements is in improvements in stripper efficiency, increased solvent flashing rates, reduced equipment size and improved particle size and uniformity.

It is possible to maintain discrete fine particles of this EPDM in both wet crumb form and through the air drying step with the addition of surface treating aids, such as calcium stearate, talc or polyethylene powder.

EXAMPLE 2

An EPDM having a Mooney viscosity of 50 ($M_L$, 1+8, 212° F.) and containing about 70 weight percent ethylene and containing about 7 weight percent ENB was dissolved in hexane to form a cement as in Example 1. A powder of this EPDM was then formed following the technique described in Example 1. Unlike the EPDM described in Example 1, this higher molecular weight and higher crystallinity EPDM did not agglomerate during stripping, drying and during shelf storage.

A free-flowing powder with a particle size between 5 to 20 mesh was produced. The volume density of the powder was about 20 lbs/ft³. The final moisture content of the dried powder was less than 2 weight percent $H_2O$.

This example demonstrates the feasibility of producing free-flowing dry powder of EPDM polymers with Mooney viscosities of about 50 ($M_L$, 1+8, 212° F.) and with an ethylene content of 70 weight percent or greater.

EXAMPLE 3

An EPDM having a Mooney viscosity of 20 ($M_L$, 1+8, 212° F.) and containing about 75 weight percent ethylene and about 5 weight percent 5-ethylidene-2-norbornene monomer was formed into a powder following the techniques described in Example 1. From the stripper was removed a wet, free-flowing powder with a particle size of 5 to 20 mesh and a moisture content of about 70 weight percent. This wet powder was dried in a hot-air, fluid-bed dryer with the air at 70° C. for 1½ hours with no apparent agglomeration. The dried product had a moisture content of less than 2 weight percent.

Both the wet and dried powders were stored in open dishes at ambient conditions for 3 days without agglomeration.

This example demonstrates the usefulness of this process for the manufacture of powdered EPDM having a Mooney viscosity of 20 ($M_L$, 1+8, 212° F.) or greater and with an ethylene content of 75 weight percent or greater. This further demonstrates that low molecular weight EPDM's with sufficiently high crystallinity can be effectively dried in hot air processes without agglomeration in the absence of surface treatment.

EXAMPLE 4

An EPDM having a Mooney viscosity of 50 ($M_L$, 1+8, 260° F.) and containing about 60 weight percent ethylene and about 3.5 weight percent 5-ethylidene-2-norbornene monomer was formed into a powder following the techniques described in Example 1. A slurry of finely divided discrete particles of cement in water was formed in the "high-shear" mixing process. This slurry was then steam stripped and a wet, free-flowing powder containing about 70 weight percent moisture was produced. The wet powder was then dried in a hot-air, fluid-bed drier with air at 70° C. for 1½ hours, with no agglomeration occurring during the drying process. The dried product had a final moisture content of less than 2 weight percent.

The particle size range of the product powder in both the wet and dried form was between 5 and 20 mesh. The wet and dried powders were stored in open dishes at ambient condition for 3 days without agglomerating.

This example demonstrates the utility of this process for the manufacture of a powdered EPDM having a Mooney viscosity of 50 ($M_L$, 1+8, 260° F.) or greater and with an ethylene content of 60 weight percent or greater. This further demonstrates that at 60 weight percent ethylene, the polymer crystallinity is sufficient to allow effective hot-air drying without agglomeration in the absence of surface treatments.

EXAMPLE 5

An EPDM having a Mooney viscosity of 50 ($M_L$, 1+8, 260° F.) and containing about 50 weight percent ethylene and about 9 weight percent 5-ethylidene-2-norbornene monomer was formed into a powder following the techniques described in Example 1. The isolated wet polymer as removed from the steam stripper was a free-flowing powder with a particle size in the range of 5 to 20 mesh and contained about 70 weight percent moisture. This free-flowing powder form was maintained without agglomeration when stored at ambient conditions for 3 days.

The wet powder was then subjected to hot-air, fluid-bed drying at 70° C. for 1 hour. During drying about 25% of the original material was observed to have coalesced onto the walls of the dryer. This tendency for agglomeration on drying can be reduced by surface treating the powder with an agent such as talc, calcium stearate or polyethylene powder and reducing the drying temperature.

This example demonstrates a process for the direct manufacture of a powder EPDM having a Mooney viscosity of 50 ($M_L$, 1+8, 260° F.) and with an ethylene content of 50 weight percent or greater.

Since many modifications and variations of this invention may be made without departing from the spirit or scope of the invention thereof, it is not intended to limit the spirit or scope thereof to the specific examples thereof.

What is claimed is:

1. A process for forming a powdered EPDM terpolymer, wherein the powder of said EPDM terpolymer has a volume density of about 10 to about 30 lb/ft$^3$ which consists of the steps of:
    (a) adding a cement of said EPDM terpolymer in a hydrocarbon solvent to about room temperature water, a volume ratio of said water to said cement being about 60 to 1 to about 2 to 1;
    (b) emulsifying under high-shear the blend of said water and said cement thereby forming a dispersion of particles of said EPDM terpolymer in said water;
    (c) steam stripping under high agitation said emulsified blend of said EPDM terpolymer, said water and said solvent thereby removing said solvent from said emulsified blend;
    (d) filtering said dispersion of said particles of said EPDM terpolymer in said water to recover a wet powder of said EPDM terpolymer; and
    (e) hot-air drying said wet powder of said EPDM terpolymer in a fluid-bed dryer, tunnel dryer or flash dryer.

2. The process of claim 1, wherein the volume ratio of water to cement is about 40 to 1 to about 2 to 1.

3. A process for forming a powdered EPDM terpolymer, wherein the powder of said EPDM terpolymer has a volume density of about 10 to about 30 lb/ft$^3$ which consists of the steps of:
    (a) adding a cement of said EPDM terpolymer in a hydrocarbon solvent to about room temperature water, a volume ratio of said water to said cement being about 60 to 1 to about 2 to 1;
    (b) emulsifying under high-shear the blend of said water and said cement thereby forming a dispersion of particles of said EPDM terpolymer in said water;
    (c) steam stripping under high agitation said emulsified blend of said EPDM terpolymer, said water and said solvent thereby removing said solvent from said emulsified blend;
    (d) filtering said dispersion of said particles of said EPDM terpolymer in said water to recover a wet powder of said EPDM terpolymer;
    (e) hot-air drying said wet powder of said EPDM terpolymer in a fluid-bed dryer, tunnel dryer or flash dryer; and
    (f) washing said particles with water prior to drying.

4. A process for forming a powdered EPDM terpolymer, wherein the powder of said EPDM terpolymer has a volume density of about 10 to about 30 lb/ft$^3$ which consists of the steps of:
    (a) adding a cement of said EPDM terpolymer in a hydrocarbon solvent to about room temperature water, a volume ratio of said water to said cement being about 60 to 1 to about 2 to 1;
    (b) emulsifying under high-shear the blend of said water and said cement thereby forming a dispersion of particles of said EPDM terpolymer in said water;
    (c) steam stripping under high agitation said emulsified blend of said EPDM terpolymer, said water and said solvent thereby removing said solvent from said emulsified blend;
    (d) filtering said dispersion of said particles of said EPDM terpolymer in said water to recover a wet powder of said EPDM terpolymer;
    (e) hot-air drying said wet powder of said EPDM terpolymer in a fluid-bed dryer, tunnel dryer or flash dryer; and
    (f) adding a non-polar process oil to said cement prior to adding said water to said cement, said oil being added at a concentration of about 20 to about 200 parts by weight per 100 parts by weight of the EPDM terpolymer.

5. A process for forming a powdered EPDM terpolymer, wherein the powder of said EPDM terpolymer has a volume density of about 10 to about 30 lb/ft$^3$ which consists of the steps of:
    (a) adding a cement of said EPDM terpolymer in a hydrocarbon solvent to about room temperature water, a volume ratio of said water to said cement being about 60 to 1 to about 2 to 1;
    (b) emulsifying under high-shear the blend of said water to said cement thereby forming a dispersion of particles of said EPDM terpolymer in said water;
    (c) steam stripping under high agitation said emulsified blend of said EPDM terpolymer, said water and said solvent thereby removing said solvent from said emulsified blend;
    (d) filtering said dispersion of said particles of said EPDM terpolymer in said water to recover a wet powder of said EPDM terpolymer;
    (e) hot-air drying said wet powder of said EPDM terpolymer in a fluid-bed dryer, tunnel dryer or flash dryer; and
    (f) dry blending an oil, a filler or a polyolefinic thermoplastic or mixture thereof with said formed powder.

* * * * *